(12) United States Patent
Hong et al.

(10) Patent No.: US 10,634,241 B2
(45) Date of Patent: Apr. 28, 2020

(54) ELECTRONIC AUTOMATIC TRANSMISSION SYSTEM

(71) Applicants: HYUNDAI MOTOR COMPANY, Seoul (KR); KIA MOTORS CORPORATION, Seoul (KR)

(72) Inventors: Gi Beom Hong, Bucheon-si (KR); Seunghyun Woo, Seoul (KR); Daeyun An, Anyang-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 234 days.

(21) Appl. No.: 15/826,216

(22) Filed: Nov. 29, 2017

(65) Prior Publication Data
US 2019/0136965 A1 May 9, 2019

(30) Foreign Application Priority Data
Nov. 3, 2017 (KR) .................... 10-2017-0145634

(51) Int. Cl.
*F16H 59/08* (2006.01)
*G01D 5/00* (2006.01)
*F16H 61/02* (2006.01)
*F16H 59/02* (2006.01)

(52) U.S. Cl.
CPC ............ *F16H 59/08* (2013.01); *G01D 5/00* (2013.01); *F16H 61/0204* (2013.01); *F16H 2059/0295* (2013.01); *F16H 2059/081* (2013.01)

(58) Field of Classification Search
CPC ..... F16H 59/08; F16H 59/12; F16H 2059/081; F16H 2059/0295; F16H 61/0204
See application file for complete search history.

(56) References Cited

U.S. PATENT DOCUMENTS

| 8,170,757 | B2 | 5/2012 | Furhoff et al. | |
| 9,254,745 | B2 | 2/2016 | Tokumo et al. | |
| 2006/0037424 | A1* | 2/2006 | Pickering | B60K 37/06 74/473.3 |
| 2014/0007726 | A1* | 1/2014 | Muraki | F16H 59/08 74/473.3 |
| 2015/0251534 | A1* | 9/2015 | Kim | B60K 20/08 180/333 |
| 2016/0238128 | A1 | 8/2016 | Rake et al. | |

FOREIGN PATENT DOCUMENTS

| JP | 2007210548 A | 8/2007 |
| JP | 2014031149 A | 2/2014 |
| KR | 10-2015-0134881 A | 12/2015 |

* cited by examiner

*Primary Examiner* — Edwin A Young
(74) *Attorney, Agent, or Firm* — Brinks Gilson & Lione

(57) ABSTRACT

The present disclosure provides an electronic automatic transmission system which is able to be operated by a driver. The electronic automatic transmission system may include: an operating wheel configured to select a shift mode; a holder configured to support the operating wheel, wherein the operating wheel is configured to change the shift mode by rotating the operating wheel or pressing the operating wheel in a radial direction of the operating wheel, and to return to an original state after changing the shift mode.

16 Claims, 14 Drawing Sheets

ELECTRONIC AUTOMATIC TRANSMISSION SYSTEM

CROSS-REFERENCE TO RELATED APPLICATION

This application claims priority to and the benefit of Korean Patent Application No. 10-2017-0145634, filed on Nov. 3, 2017, which is incorporated herein by reference in its entirety.

FIELD

The present disclosure relate to an electronic automatic transmission system, and more particularly to an electronic automatic transmission system configured to select a shift mode using an electrical signal.

BACKGROUND

The statements in this section merely provide background information related to the present disclosure and may not constitute prior art.

A vehicle transmission is a device configured to maintain an appropriate gear ratio in accordance with the numbers of rotations of an engine and speed of a vehicle, and a shift mode of the transmission may be adjusted by a driver's manipulation through a shift control device.

As a shift control device, there may be a mechanical control type in which a shift mode is changed by transmitting an operation force applied to a shift lever operated by a driver to a transmission through a mechanical mechanism. Also, there may be an electronic transmission type in which a shift mode is changed through an electrical signal generated by a user's operation instead of a user's operation force being directly transmitted to a transmission.

In recent years, various electronic shift control device has been used to improve an indoor appearance, convenience of an operation, and space utilization.

SUMMARY

It is an aspect of the present disclosure to provide an electronic automatic transmission system which can be easily operated by a driver.

It is another aspect of the present disclosure to provide an electronic automatic transmission system in which a space occupied by an operating part is reduced and space utilization of a vehicle interior is improved.

It is also another aspect of the present disclosure to provide an electronic automatic transmission system in which a malfunction due to a user's carelessness may be reduced.

The objects of the present disclosure are not limited to the above-mentioned objects, and other objects which are not mentioned may be clearly understood by those skilled in the art from the following description.

Additional aspects of the disclosure will be set forth in part in the description which follows and, in part, will be obvious from the description, or may be learned by practice of the disclosure.

In one aspect of the present disclosure, an electronic automatic transmission system includes: an operating wheel configured to select a shift mode; a holder configured to support the operating wheel, wherein the operating wheel may be configured to change the shift mode by rotating the operating wheel or pressing the operating wheel in a radial direction of the operating wheel and return to an original state after changing the shift mode.

The shift mode may be configured to set to a reverse (R) mode or a driving (D) mode by rotating the operating wheel in both directions of the operating wheel in an initial state and set to a neutral (N) mode by pressing the operating wheel in the radial direction of the operating wheel.

The operating wheel may be configured to return to the original state by an elastic force of an elastic member.

The elastic member may include a first elastic member configured to exert an elastic force in a rotational direction of the operating wheel.

The holder may include an accommodation groove that is configured to accommodate the first elastic member; and a pressing member configured to connect to the operating wheel, wherein the first elastic member is provided in the accommodation groove and press the first elastic member in accordance with a rotation of the operating wheel.

The electronic automatic transmission system may further include a support member configured to support the holder such that the holder moves in a forward direction and a backward direction, wherein the elastic member may further include a second elastic member configured to exert an elastic force between the support member and the holder.

The operating wheel may be configured to return to the original state by a magnetic force of permanent magnets.

The permanent magnets may include a first permanent magnet arranged on both sides of the operating wheel; and a second permanent magnet arranged in the holder and configured to act a repulsive force against the first permanent magnet.

The holder may include a guide part configured to guide a radial movement of the operating wheel such that the shift mode is set to the neutral (N) mode.

The electronic automatic transmission system may further include a detection device configured to detect that the operating wheel selects the shift mode, wherein the shift mode is set to any mode of the reverse (R) mode, the driving (D) mode, or the neutral (N) mode.

The detection device may include a switch configured to connect to a contact by selecting the shift mode through the operating wheel, wherein the shift mode is set to any mode of the reverse (R) mode, the driving (D) mode, or the neutral (N) mode.

The switch may include a first switch configured to detect a setting of the driving (D) mode; a second switch configured to detect a setting of the reverse (R) mode; and a third switch configured to detect a setting of the neutral (N) mode, and the detection device may further include a first detection member configured to be in contact with an outer circumferential surface of the operating wheel and press the first switch when the operating wheel rotates to a position corresponding to the driving (D) mode; a second detection member configured to be in contact with the outer circumferential surface of the operating wheel and press the second switch when the operating wheel rotates to a position corresponding to the reverse (R) mode; and a third detection member configured to be in contact with the holder and press the third switch when the operating wheel moves to a position corresponding to the neutral (N) mode.

Inclined parts recessed in the radial direction of the operating wheel may be provided in the outer circumferential surface of the operating wheel such that the first detection member and the second detection member are separated from the outer circumferential surface of the operating wheel in a rotational section between the driving (D) mode and the reverse (R) mode.

The operating wheel may be configured to be in direct contact with the operating wheel when the operating wheel rotates to a position corresponding to the driving (D) mode.

The switch may include a first switch configured to be in direct contact with the operating wheel when the operating wheel rotates to the position corresponding to the driving (D) mode; a second switch configured to be in direct contact with the operating wheel when the operating wheel rotates to the position corresponding to the reverse (R) mode; and a third switch provided to be in direct contact with the operating wheel when the operating wheel moves to the position corresponding to the neutral (N) mode.

The detection device may include a detection part interlocked with the operating wheel and having an asymmetrical shape with respect to the radial direction of the operating wheel; and a three-dimensional (3D) sensor configured to detect a position of the operating wheel based on a change in distance that is caused by a movement of the detection part.

The electronic automatic transmission system may include an actuator configured to restrict a movement of the operating wheel with the same shift mode as a current shift mode such that the same shift mode is not selected after the shift mode is set to any mode of the reverse (R) mode, the driving (D) mode, or the neutral (N) mode.

The detection device is configured to invalidate an input signal when the detection device detects that the same shift mode is selected again after detecting that the shift mode is set to any mode of the reverse (R) mode, the driving (D) mode, or the neutral (N) mode or when the detection device detects that multiple shift modes are selected.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
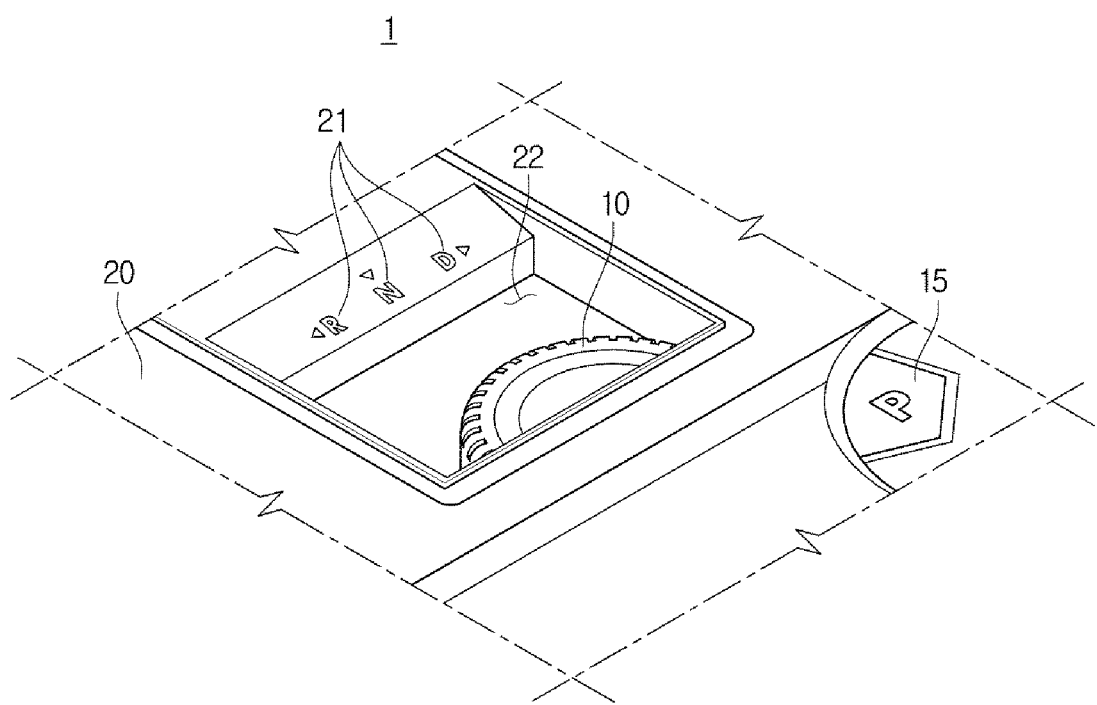
FIG. 1 is a diagram showing an appearance of an electronic automatic transmission system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The forms described in the specification and the configurations illustrated in the drawings are merely preferred examples of the disclosed disclosure, and there may be various modifications which can replace the forms and drawings of the specification at the time of filing of the present application.

The terms used in the specification are used to describe examples and are not intended to limit and/or restrict the disclosed disclosure. The singular forms include plural forms unless the context clearly dictates otherwise. In the specification, The terms "include," "have," and the like are used to indicate the presence of features, numbers, steps, operations, constituent elements, components, or combinations thereof stated in the specification, and do not preclude the presence or addition of one or more other features, numbers, steps, operations, constituent elements, components, or combinations thereof.

The terms including ordinals such as "first" and "second" used in the specification may be used to describe various constituent elements, but the constituent elements are not limited by such terms and such terms are used merely for the purpose of distinguishing one constituent element from another. For example, a first constituent element may be referred to as a second constituent element, and similarly a second constituent element may also be referred to as a first constituent element without departing from the scope of the present disclosure. The term "and/or" includes any combination of a plurality of associated stated items or any of a plurality of associated stated items.

On the other hand, the terms "front," "rear," "upper," and "lower" used in the following description are defined based on the drawing, and the shape and position of each constituent element are not limited by such terms.

In the following description, vehicles refer to various devices for moving an object to be transported such as a person, a thing, or an animal from a starting point to a destination. Vehicles may include vehicles configured to travel on roads or tracks, vessels configured to travel on an ocean or a river, and airplanes configured to fly through the sky using the action of air.

Also, vehicles traveling on roads or tracks may move in a predetermined direction in accordance with the rotation of at least one wheel and may include, for example, three or four-wheeled vehicles, construction machines, two-wheeled vehicles, prime movers, bicycles, and trains traveling on the track.

Some forms of the present disclosure will be described in detail below with reference to the accompanying drawings.

Figure 2:
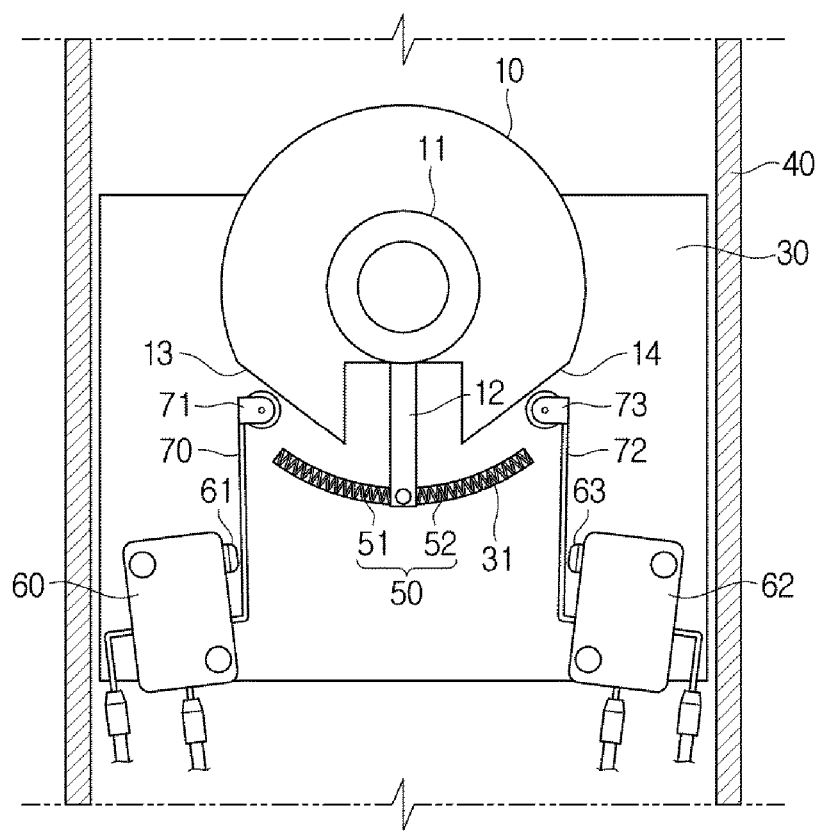
FIG. 2 is a diagram showing an internal state before the electronic automatic transmission system.
Figure 3:
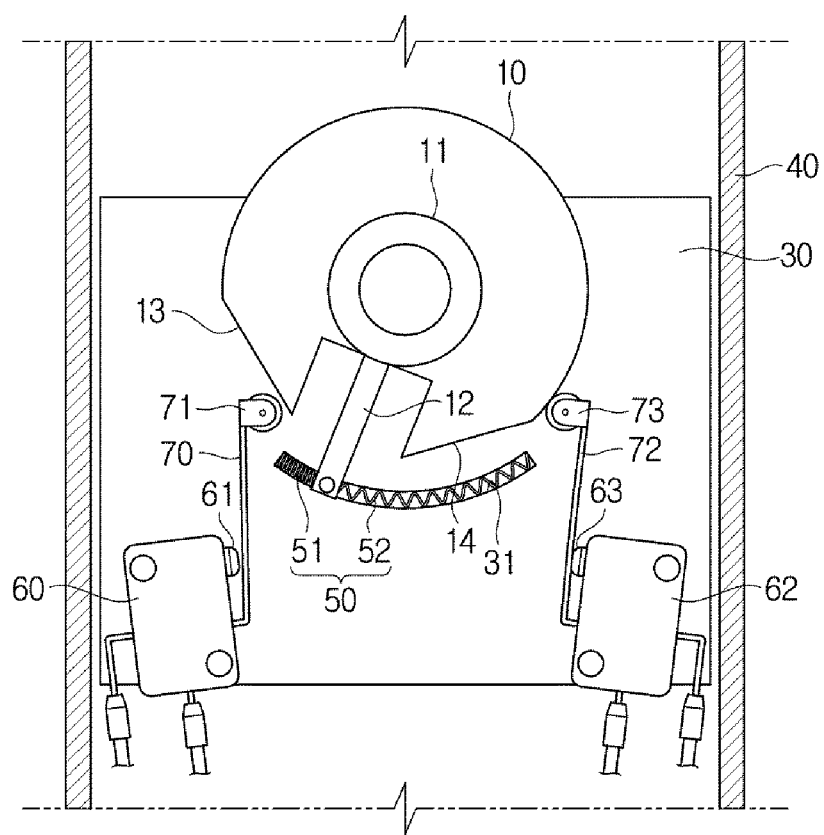
FIG. 3 is a diagram showing a state in which an operating wheel is manipulated to a driving (D) mode in FIG. 2.
Figure 4:
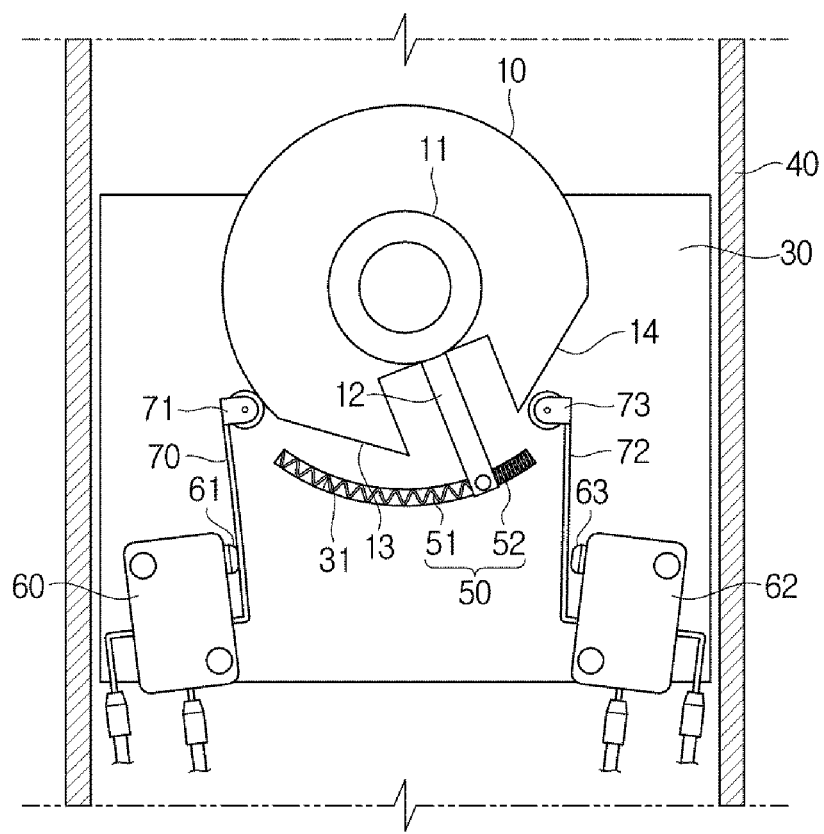
FIG. 4 is a diagram showing a state in which the operating wheel is manipulated to a reverse (R) mode in FIG. 2.

FIG. 1 is a diagram showing an appearance of an electronic automatic transmission system in some forms of the present disclosure. FIG. 2 is a diagram showing an internal state before the electronic automatic transmission system in some forms of the present disclosure is operated. FIG. 3 is a diagram showing a state in which an operating wheel is manipulated to a driving (D) mode in FIG. 2. FIG. 4 is a diagram showing a state in which the operating wheel is manipulated to a reverse (R) mode in FIG. 2.

Referring to FIG. 1, an electronic automatic transmission system 1 includes an operating wheel 10 configured to manipulate a shift mode, the operating wheel 10 may be provided such that a part thereof is exposed to the outside and a portion other than the part is covered by a cover 20.

A groove 22 configured to accommodate the operating wheel 10 may be formed in the cover 20, and a part of the operating wheel 10 may be exposed by the groove 22 for the purpose of a user's operation.

A symbol 21 configured to guide the user on how to use the operating wheel 10 may be provided in front of the operating wheel 10.

Also, a parking button 15 configured to operate and release a parking brake may be provided at a portion adjacent to the operating wheel 10.

In some forms of the present disclosure, the electronic automatic transmission system 1 may be provided in a console inside a vehicle. Here, a position where the electronic automatic transmission system 1 is arranged is not limited thereto and may be provided in a portion which is easily accessible by the user such as a center fascia.

Referring to FIGS. 2 to 6, the electronic automatic transmission system 1 may include the operating wheel 10 for the user's operation and a holder 30 configured to rotatably support the operating wheel 10.

The operating wheel 10 may include a rotating shaft 11, and an elastic member 50 configured to exert an elastic force to return the operating wheel 10 to an initial state before the operation when an operation force is removed after the user manipulates the operating wheel 10 may be provided in the holder 30.

The elastic member 50 may be accommodated in an accommodation groove 31 provided in the holder 30.

The operating wheel 10 may include a pressing member 12 capable of pressing the elastic member 50 when the user rotates the operating wheel 10.

The pressing member 12 may cause one side of the elastic member 50 to be in a compressed state when the user rotates the operating wheel 10 and cause the operating wheel 10 to return to its original state before the operation by transmitting a restoring force of the elastic member 50 to the operating wheel 10 when the user releases the operating wheel 10.

The pressing member 12 may be fixed to a longitudinal center portion of one elastic member 50, and a pair of elastic members 51 and 52 may be separately arranged on both sides of the accommodation groove 31 based on the pressing member 12. The pressing member 12 may be integrally provided with the operating wheel 10 or may be coupled and connected to the operating wheel 10 as a separate member from the operating wheel 10.

The electronic automatic transmission system 1 may include a detection device configured to detect the operating wheel 10 so that the user can change the shift mode.

The detection device may be provided to detect an operation of the operating wheel by the user so that the shift mode is set to the reverse (R) mode, the driving (D) mode, and the neutral (N) mode.

In some forms of the present disclosure, the detection device may include switches to which contacts are connected through an operation for setting the reverse (R) mode, the driving (D) mode, and the neutral (N) mode of the operating wheel.

The switches may include a first switch 60 configured to monitor the setting of the driving (D) mode, a second switch 62 configured to monitor the setting of the reverse (R) mode, and a third switch 64 configured to monitor the setting of the neutral (N) mode.

The second switch 62 may be arranged in the lower right part of the holder 30, and a button 63 configured to press a contact may be provided in one side thereof.

A first detection member 72 in contact with an outer circumferential surface of the operating wheel 10 and configured to press the button 63 of the second switch 62 when the operating wheel 10 is rotated for setting the driving (D) mode may be installed at one side of the second switch 62.

The first detection member 72 may be formed of a metallic wire or plate with elasticity, and may include a roller 73 configured to be in smooth contact with an outer circumferential surface of the operating wheel 10 at one end adjacent to the operating wheel 10.

The first switch 60 may include a button 61 arranged in the lower left part of the holder 30 and configured to press a contact at one side thereof.

A second detection member 70 in contact with the outer circumferential surface of the operating wheel 10 and configured to press the button 61 of the first switch 60 when the operating wheel 10 is rotated for setting the driving (D) mode may be installed at one side of the first switch 60.

The second detection member 70 may be formed of a metallic wire or plate with elasticity, and may include a roller 71 configured to be in smooth contact with an outer circumferential surface of the operating wheel 10 at one end adjacent to the operating wheel 10.

Inclined parts 13 and 14 recessed in a radial direction of the operating wheel 10 may be provided in the outer circumferential surface of the operating wheel 10 so that the roller 73 of the first detection member 72 and the roller 71 of the second detection member 70 are separated from the outer circumferential surface of the operating wheel 10 in a rotational section between the driving (D) mode and the reverse (R) mode.

As shown in FIG. 3, the inclined part 13 and the roller 71 are maintained in a separated state but the roller 73 of the first detection member 72 is pressed along the outer circumferential surface of the operating wheel 10 so that the first detection member 72 presses the button 63 of the first switch 60 when the user rotates the operating wheel 10 clockwise based on the drawing for setting the driving (D) mode. Thus, the first detection member 72 presses the button 63 of the first switch 60. Therefore, an electrical signal is formed using the first switch 60 and thus the driving (D) mode can be set. When the user releases the operating wheel 10 after the driving (D) mode has been set, the operating wheel 10 returns to its original state before the operation as shown in FIG. 2 due to a restoring force of the compressed elastic member 51.

On the other hand, as shown in FIG. 4, the inclined part 14 and the roller 73 are maintained in a separated state but the roller 71 of the second detection member 70 is pressed along the outer circumferential surface of the operating wheel 10 so that the second detection member 70 presses the button 61 of the first switch 60 when the user rotates the operating wheel 10 counterclockwise based on the drawing for setting the reverse (R) mode. Therefore, an electrical signal is formed using the first switch 60 and thus the reverse (R) mode can be set. When the user releases the operating wheel 10 after the reverse (R) mode has been set, the operating wheel 10 returns to its original state before the operation as shown in FIG. 2 due to a restoring force of the compressed elastic member 52.

Figure 5:
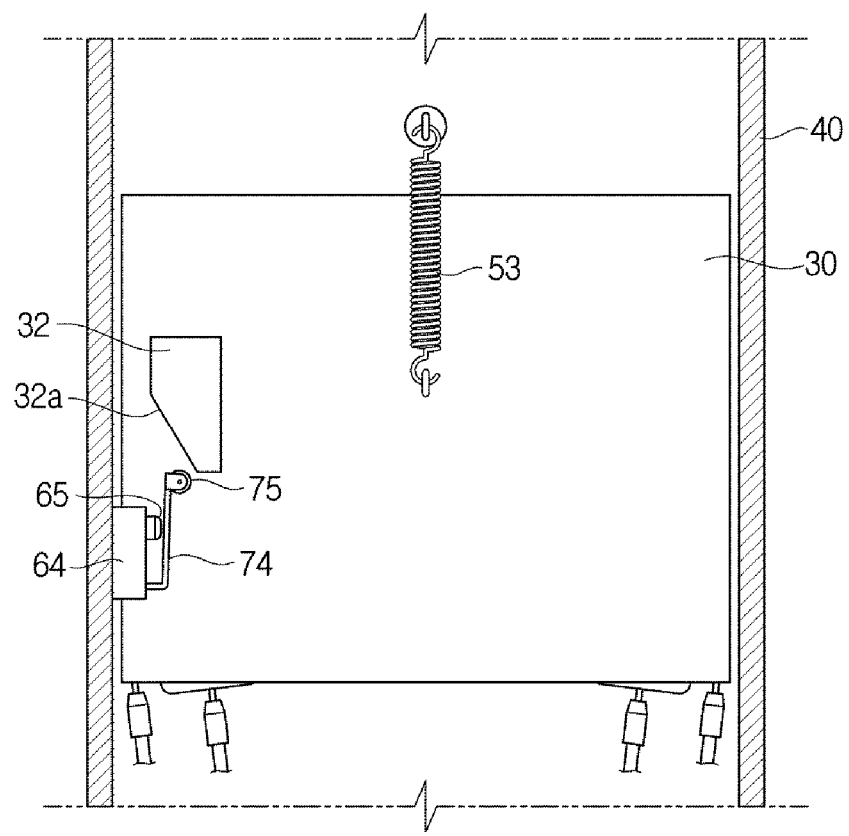
FIG. 5 is a diagram showing a state of a lower part before the electronic automatic transmission system is manipulated.
Figure 6:
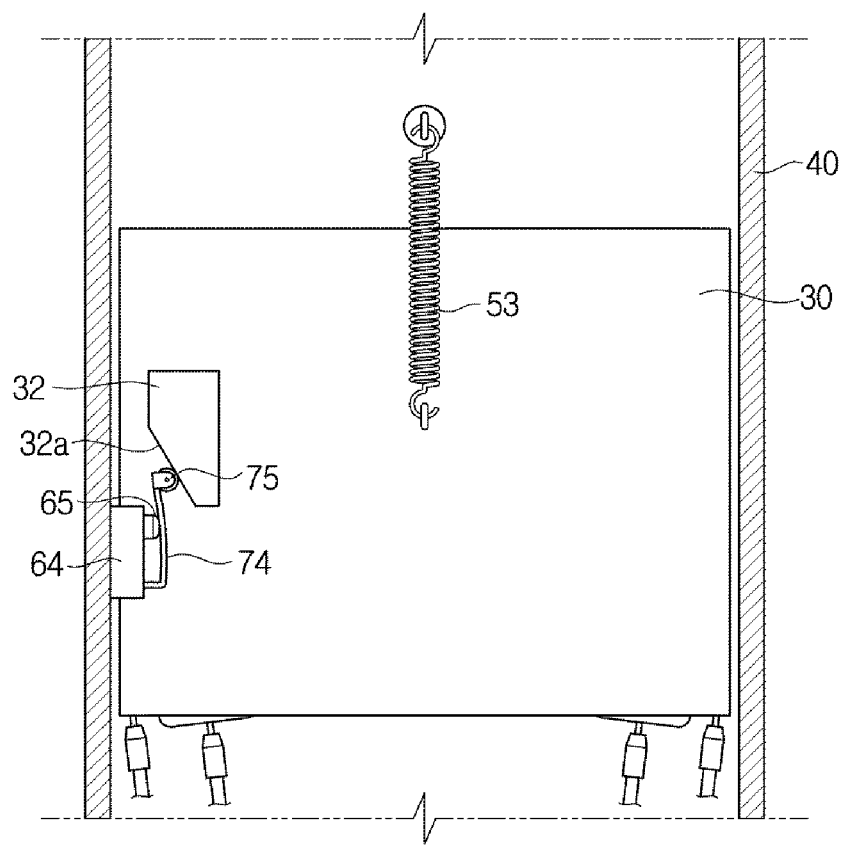
FIG. 6 is a diagram showing a state in which the operating wheel is manipulated to a neutral (N) mode in FIG. 5.

Referring to FIGS. 5 and 6, the electronic automatic transmission system may include the detection device configured to set the neutral (N) mode.

The holder 30 may be slidably coupled to a support member 40. Thus, the holder 30 can move forward and backward in a front-rear direction and the operating wheel 10 installed in the holder 30 can also move forward and backward.

The support member 40 may be provided separately from the cover 20 or may be a part of the cover 20.

An elastic member 53 configured to resiliently support the holder 30 may be installed between the support member 40 and the holder 30.

A third switch 64 configured to detect the backward movement of the operating wheel 10 for setting the neutral (N) mode by the user may be installed at one side of the support member 40.

A button 65 configured to press the contact of the switch may be provided at one side of the third switch 64, and a third detection member 74 configured to press the button 65 of the third switch 64 when the operating wheel 10 is moved backward for setting the neutral (N) mode may be installed at one side of the third switch 64.

The third detection member 74 may be formed of a metallic wire or plate with elasticity and may include a roller 75 configured to be in smooth contact with an inclined surface 31a which will be described below.

An inclined part 32 having an inclined surface 32a for pressing the third switch 64 through the roller 75 and the third detection member 74 when the operating wheel 10 is moved backward is provided in the holder 30. As shown in FIG. 6, when the operating wheel 10 is moved backward, the inclined surface 32a comes into contact with the roller 75 so that the third detection member 74 presses the button 65 of the third switch 64. Therefore, an electrical signal is formed using the third switch 64 and thus the neutral (N) mode can be set.

The operating wheel 10 returns to its original state before the operation as shown in FIG. 5 due to a restoring force of the tensioned elastic member 53 when the user releases the operating wheel 10 after the neutral (N) mode has been set.

Figure 7:
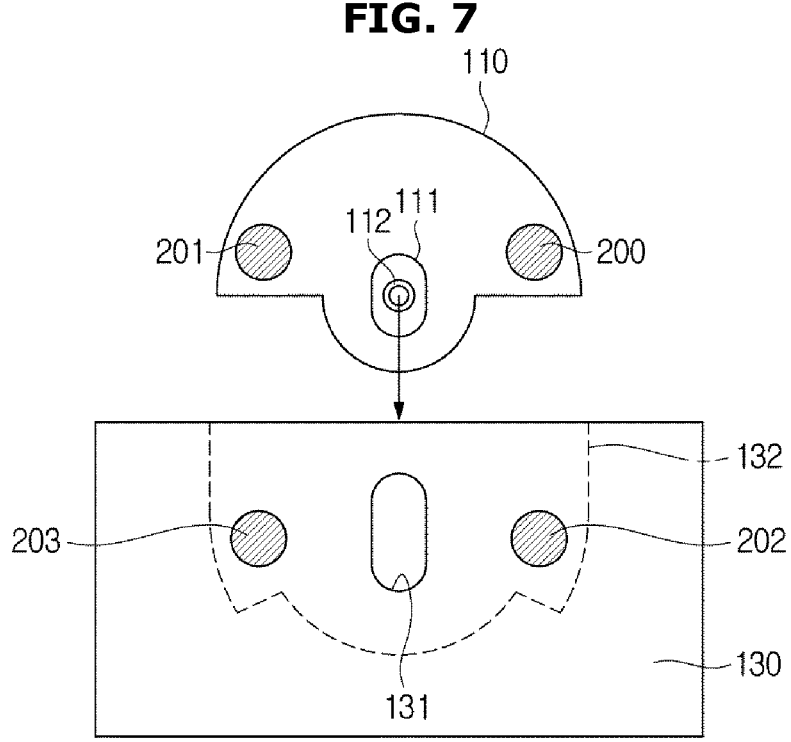
FIG. 7 is an exploded view showing an electronic automatic transmission system.
Figure 8:
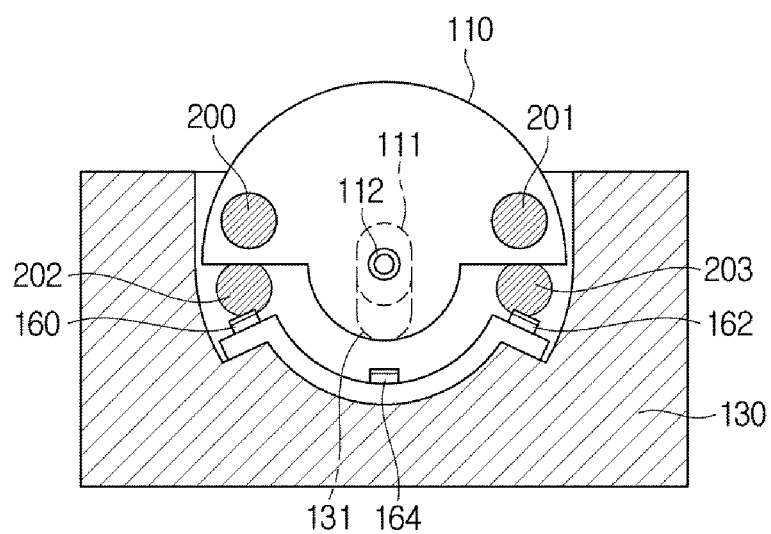
FIG. 8 is a diagram showing an internal state before the electronic automatic transmission system is operated.
Figure 9:
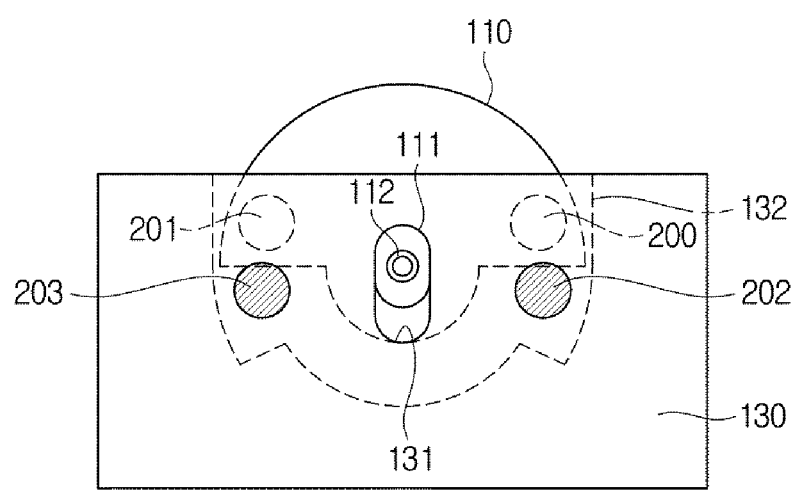
FIG. 9 is a diagram showing an opposite surface of the electronic automatic transmission system illustrated in FIG. 8.
Figure 10:
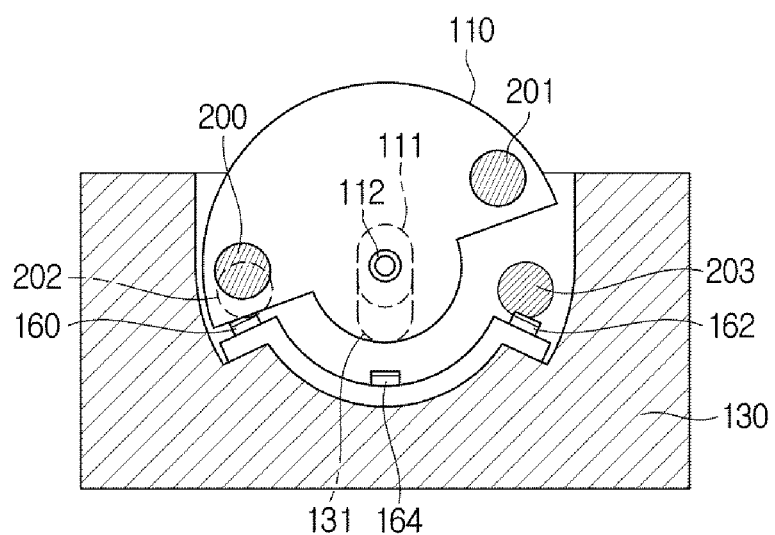
FIG. 10 is a diagram showing a state in which the operating wheel is manipulated to the driving (D) mode in FIG. 9.
Figure 11:
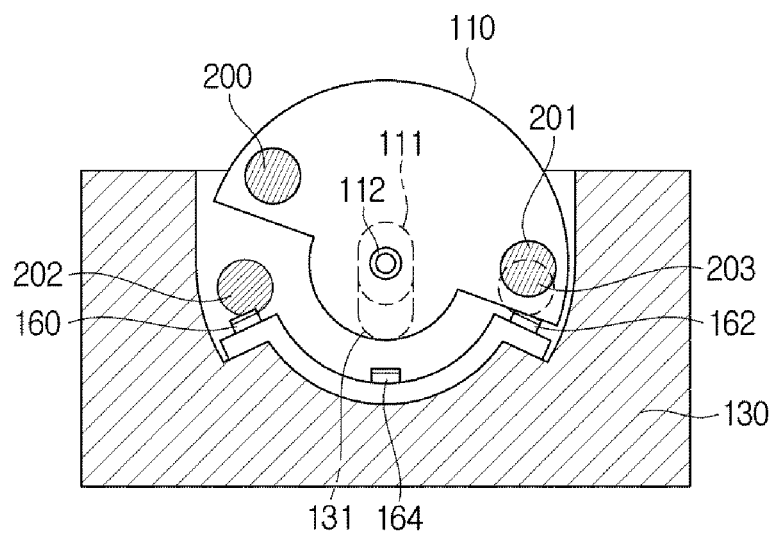
FIG. 11 is a diagram showing a state in which the operating wheel is manipulated to the reverse (R) mode in FIG. 9.
Figure 12:
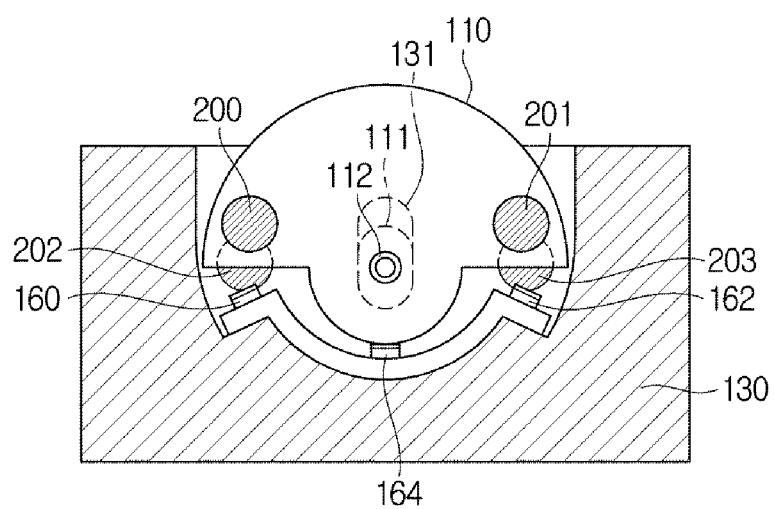
FIG. 12 is a diagram showing a state in which the operating wheel is manipulated to the neutral (N) mode in FIG. 9.

FIG. 7 is an exploded view showing an electronic automatic transmission system in some forms of the present disclosure. FIG. 8 is a diagram showing an internal state before the electronic automatic transmission system in some forms of the present disclosure is operated. FIG. 9 is a diagram showing an opposite surface of the electronic automatic transmission system illustrated in FIG. 8. FIG. 10 is a diagram showing a state in which the operating wheel is manipulated to the driving (D) mode in FIG. 9. FIG. 11 is a diagram showing a state in which the operating wheel is manipulated to the reverse (R) mode in FIG. 9. FIG. 12 is a diagram showing a state in which the operating wheel is manipulated to the neutral (N) mode in FIG. 9.

Referring to FIGS. 7 to 12, the electronic automatic transmission system in some forms of the present disclosure may include an operating wheel 110 for the user's operation and a holder 130 configured to support the operating wheel 110.

The operating wheel 110 may include a rotating shaft 112 for rotation, and a shaft support member 111 configured to rotatably support the rotating shaft 112 may be coupled to the rotating shaft 112.

The holder 130 may include a guide part 131 to which the shaft support member 111 can be coupled and an accommodation groove 132 in which the operating wheel 110 can be accommodated.

The shaft support member 111 may be formed to have an approximately elliptical cross section, and the guide part 131 may be formed in an elliptical shape having a long axis longer than a long axis of the shaft support member 111. Thus, the operating wheel 110 may be guided in forward and backward movements using the shaft support member 111 and the guide part 131 as well as the rotation for the operation.

A pair of permanent magnets 200 and 201 may be arranged on both sides of the operating wheel 110, and a pair of permanent magnets 202 and 203 arranged adjacent to the pair of permanent magnets 200 and 201 installed in the operating wheel 110 may be arranged in the holder 130.

The pair of permanent magnets 200 and 201 installed in the operating wheel 110 and the pair of permanent magnets 202 and 203 installed in the holder 130 may be arranged to exert a repulsive force between magnets adjacent to each other. In other words, the permanent magnets 201 and 203 adjacent to each other at one side of the operating wheel 110 and the permanent magnets 200 and 202 adjacent to each other at the other side of the operating wheel 110 may be arranged so that the same polarities thereof face each other so that a repulsive force can act against each permanent magnet in a state before the operating wheel 110 is selected.

Therefore, as shown in FIG. 8, when the operating wheel 110 is not selected, a neutral state in which a distance between the permanent magnets 201 and 203 adjacent to each other at one side of the operating wheel 110 is the same as a distance between the permanent magnets 200 and 202 adjacent to each other at the other side of the operating wheel 110 can be maintained, and the operating wheel 110 can be returned to such a state after the operation.

A switch 162 configured to detect the driving (D) mode setting, a switch 160 configured to detect the reverse (R) mode setting, and a switch 164 configured to detect the neutral (N) mode setting may be arranged in the holder 130.

The switches 160, 162, and 164 may be arranged in positions in which the switches can be in direct contact with a part of the operating wheel at each mode to be set, and may be arranged adjacent to both lower sides and a lower center of the accommodation groove 132 like in some forms of the present disclosure.

As shown in FIG. 10, when the user rotates the operating wheel 110 counterclockwise based on the drawing for setting the reverse (R) mode, the left portion of the operating wheel 110 directly presses the switch 160 so that an electrical signal is formed and thus the reverse (R) mode can be set. The operating wheel 110 can be returned to the state in FIG. 8 due to a repulsive force between the permanent magnets when the user releases the operating wheel 110 after the reverse (R) mode has been set.

On the other hand, as shown in FIG. 11, the right portion of the operating wheel 110 directly presses the switch 162 so that an electrical signal is formed and thus the driving (D) mode can be set when the user rotates the operating wheel 110 clockwise based on the drawing for setting the driving (D) mode. The operating wheel 110 can be returned to the state in FIG. 8 due to a repulsive force between the permanent magnets when the user releases the operating wheel 110 after the driving (D) mode has been set.

As shown in FIG. 12, the shaft support member 111 is guided and moved backward along the guide part 131 and the rear portion of the center of the operating wheel 110 presses the switch 164 so that an electrical signal is formed and thus the neutral (N) mode can be set when the user pushes the operating wheel 110 backward for setting the neutral (N) mode.

Figure 13:
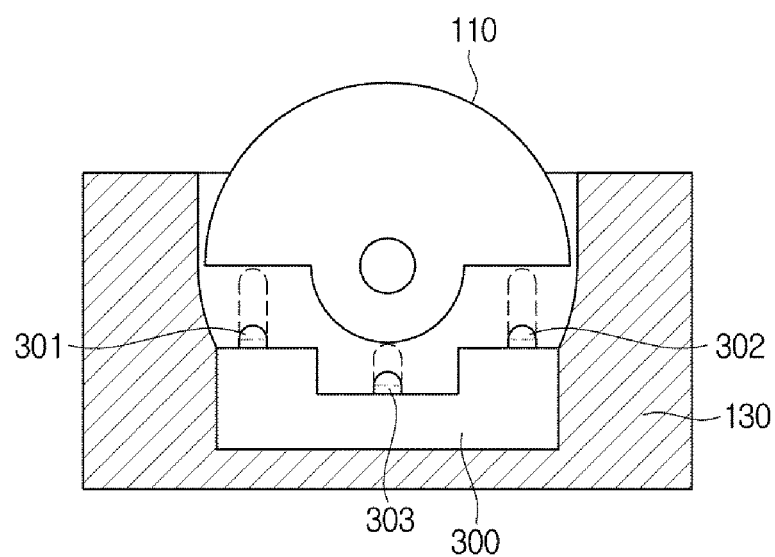
FIG. 13 is a diagram showing an inside of an electronic automatic transmission system.

FIG. 13 is a diagram showing an inside of an electronic automatic transmission system in some forms of the present disclosure In some forms of the present disclosure, the electronic automatic transmission system may include an actuator 300 configured to restrict the movement of the operating wheel 110 to the same shift mode as the current shift mode to prevent the same shift mode from being selected after the shift mode of the operating wheel 110 is selected to any one of the reverse (R) mode, the driving (D) mode, and the neutral (N) mode.

The actuator 300 may have plungers 301, 302, and 303 provided so as to be able to protrude to prevent the operating wheel 110 from being selected to any position of the reverse (R) mode, the driving (D) mode, and the neutral (N) mode.

The plunger 301 may protrude to prevent the reverse (R) mode from being selected and then selected again, the plunger 302 may protrude to prevent the shift mode from being selected to a position of the neutral (N) mode, and the plunger 303 may protrude to prevent the operating wheel 110 from being selected to a position of the driving (D) mode.

When such an actuator 300 is applied, it is possible to physically block the input of the overlapping manipulation through the operating wheel 110.

In addition, even when the actuator 300 is not applied as described above, when a redundant or erroneous signal is input through the detection device in the above-described form, such a signal can be invalidated and thus an erroneous manipulation can be prevented.

In other words, when it is detected that the same shift mode is selected again after it is detected by the detection device that the shift mode of the operating wheel is selected to any one of the reverse (R) mode, the driving (D) mode, and the neutral (N) mode or a manipulation with respect to a plurality of shift modes is detected, the setting may be performed so that such an input signal may be invalidated through the detection device.

Also, when such an erroneous manipulation is input, it is possible to warn the driver of the erroneous manipulation through a warning sound or other notifications through a display.

Figure 14:
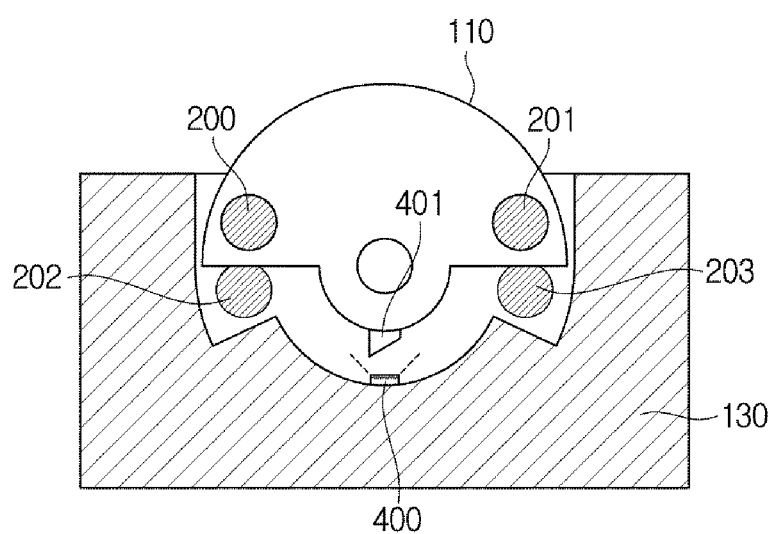
FIG. 14 is a diagram showing the inside of the electronic automatic transmission system.

FIG. 14 is a diagram showing the inside of the electronic automatic transmission system in some forms of the present disclosure.

In some forms of the present disclosure, the detection device configured to detect a manipulation of the operating wheel 110 may include a detection part 401 coupled to or integrally formed and interlocked with the operating wheel 110 and having an asymmetrical shape with respect to a radial direction of the operating wheel 110 and a three-dimensional (3D) sensor 400 configured to detect a position of the operating wheel 110 using a change in distance due to the movement of the detection part 401 depending on a manipulation of the operating wheel 110.

When the operating wheel 110 is rotated rightward and leftward for setting the driving (D) or reverse (R) mode, with respect to an asymmetric shape of the detection part 401, whether the operating wheel 110 is selected for setting the driving (D) mode or operated for setting the reverse (R) mode can be detected using a difference in right and left change values recognized in the 3D sensor 400, and the neutral (N) mode can be recognized using a change in the entire right and left change values recognized in the 3D sensor 400, that is, a change in distance between the detection part 401 and the 3D sensor 400.

The above-described forms are merely examples, and combinations or modifications through replacement of the constituent elements of the illustrated forms can be included in the technical idea of the disclosure described in the appended claims.

In the above description, some forms of the present disclosure have been illustrated and described. However, the present disclosure is not limited to the above-described forms, and it will be understood by those of ordinary skill in the art to which the disclosure pertains that various modifications are possible without departing from the gist of the technical idea of the disclosure disclosed in the appended claims.

The description of the disclosure is merely exemplary in nature and, thus, variations that do not depart form the substance of the disclosure are intended to be within the scope of the disclosure. Such variations are not to be regarded as a departure from the spirit and scope of the disclosure.

What is claimed is:

1. An electronic automatic transmission system comprising:
    an operating wheel configured to select a shift mode; and
    a holder configured to support the operating wheel,
        wherein the operating wheel is configured to:
            change the shift mode by rotating the operating wheel or pressing the operating wheel in a radial direction of the operating wheel; and
            return to an original state after changing the shift mode, and wherein the shift mode is configured to:
            set to a reverse (R) mode or a driving (D) mode by rotating the operating wheel in both directions of the operating wheel in an initial state; and
            set to a neutral (N) mode by pressing the operating wheel in the radial direction of the operating wheel.

2. The electronic automatic transmission system of claim 1, wherein the operating wheel is configured to return to the original state by an elastic force of an elastic member.

3. The electronic automatic transmission system of claim 2, wherein the elastic member comprises:
    a first elastic member configured to exert an elastic force in a rotational direction of the operating wheel.

4. The electronic automatic transmission system of claim 3, wherein the holder comprises:
    an accommodation groove that is configured to accommodate the first elastic member; and
    a pressing member configured to:
        connect to the operating wheel, wherein the first elastic member is provided in the accommodation groove; and
        press the first elastic member according to a rotation of the operating wheel.

5. The electronic automatic transmission system of claim 3, wherein the system further comprises:

a support member configured to support the holder such that the holder moves in a forward direction and a backward direction,
wherein the elastic member further comprises a second elastic member configured to exert an elastic force between the support member and the holder.

6. The electronic automatic transmission system of claim 1, wherein the operating wheel is configured to return to the original state by a magnetic force of permanent magnets.

7. The electronic automatic transmission system of claim 6, wherein the permanent magnets comprise:
first permanent magnets arranged on both sides of the operating wheel; and
second permanent magnets arranged in the holder and configured to act as a repulsive force against the first permanent magnets.

8. The electronic automatic transmission system of claim 7, wherein the holder comprises:
a guide part configured to guide a radial movement of the operating wheel such that the shift mode is set to the neutral (N) mode.

9. The electronic automatic transmission system of claim 1, wherein the system further comprises:
a detection device configured to detect that the operating wheel selects the shift mode, wherein the shift mode is set to any mode of the reverse (R) mode, the driving (D) mode, or the neutral (N) mode.

10. The electronic automatic transmission system of claim 9, wherein the detection device comprises:
a switch configured to connect to a contact by selecting the shift mode through the operating wheel, wherein the shift mode sets to any mode of the reverse (R) mode, the driving (D) mode, or the neutral (N) mode.

11. The electronic automatic transmission system of claim 10, wherein the switch comprises:
a first switch configured to detect a setting of the driving (D) mode;
a second switch configured to detect a setting of the reverse (R) mode; and
a third switch configured to detect a setting of the neutral (N) mode, and wherein the detection device further comprises:
a first detection member configured to be in contact with an outer circumferential surface of the operating wheel and to press the first switch when the operating wheel rotates to a position corresponding to the driving (D) mode;
a second detection member configured to be in contact with the outer circumferential surface of the operating wheel and to press the second switch when the operating wheel rotates to a position corresponding to the reverse (R) mode; and
a third detection member configured to be in contact with the holder and to press the third switch when the operating wheel moves to a position corresponding to the neutral (N) mode.

12. The electronic automatic transmission system of claim 11, wherein:
inclined parts recessed in the radial direction of the operating wheel are provided in the outer circumferential surface of the operating wheel such that the first detection member and the second detection member are separated from the outer circumferential surface of the operating wheel in a rotational section between the driving (D) mode and the reverse (R) mode.

13. The electronic automatic transmission system according to claim 10, wherein the switch comprises:
a first switch configured to be in direct contact with the operating wheel when the operating wheel rotates to the position corresponding to the driving (D) mode;
a second switch configured to be in direct contact with the operating wheel when the operating wheel rotates to the position corresponding to the reverse (R) mode; and
a third switch provided to be in direct contact with the operating wheel when the operating wheel moves to the position corresponding to the neutral (N) mode.

14. The electronic automatic transmission system of claim 9, wherein the detection device comprises:
a detection part interlocked with the operating wheel and having an asymmetrical shape with respect to the radial direction of the operating wheel; and
a three-dimensional (3D) sensor configured to detect a position of the operating wheel based on a change in distance that is caused by a movement of the detection part.

15. The electronic automatic transmission system of claim 9, wherein the system further comprises:
an actuator configured to restrict a movement of the operating wheel with the same shift mode as a current shift mode such that the same shift mode is not selected after the shift mode sets to any mode of the reverse (R) mode, the driving (D) mode, or the neutral (N) mode.

16. The electronic automatic transmission system of claim 9, wherein:
the detection device is configured to invalidate an input signal when the detection device detects that the same shift mode is selected again after detecting that the shift mode sets to any mode of the reverse (R) mode, the driving (D) mode, or the neutral (N) mode or when the detection device detects that multiple shift modes are selected.

* * * * *